(12) United States Patent
Koziol et al.

(10) Patent No.: US 9,856,933 B2
(45) Date of Patent: Jan. 2, 2018

(54) DEBRIS ERADICATING BRAKE HEAD FOR A TRUCK MOUNTED BRAKE SYSTEM

(71) Applicant: Westinghouse Air Brake Technologies Corporation, Wilmerding, PA (US)

(72) Inventors: Michael Koziol, Berwyn, IL (US); Scott Lee Natschke, Bourbonnais, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 15/151,724

(22) Filed: May 11, 2016

(65) Prior Publication Data

US 2017/0328427 A1    Nov. 16, 2017

(51) Int. Cl.
*F16D 65/06*  (2006.01)
*B61H 1/00*   (2006.01)

(52) U.S. Cl.
CPC ............. *F16D 65/062* (2013.01); *B61H 1/00* (2013.01)

(58) Field of Classification Search
CPC ................................ F16D 65/062; B61H 1/00
USPC ......... 188/219.1, 220.1, 222.1, 222.6, 223.6, 188/236, 242
See application file for complete search history.

(56) References Cited

U.S. PATENT DOCUMENTS

| 4,463,836 A | 8/1984 | Murphy et al. | |
|---|---|---|---|
| 4,480,721 A * | 11/1984 | Murphy | B61H 13/38 188/212 |
| 4,519,480 A * | 5/1985 | Nelson | B61H 13/38 188/195 |
| 4,766,980 A * | 8/1988 | Engle | B60T 17/081 188/206 R |
| 4,771,868 A * | 9/1988 | Haydu | B61H 13/02 188/52 |
| 4,830,148 A * | 5/1989 | Hart | B61H 13/36 188/219.1 |

(Continued)

FOREIGN PATENT DOCUMENTS

JP    2013117236 A    6/2013

OTHER PUBLICATIONS

Holland Company, Hollube brake beam guide wear eliminator, Holland, p. 1, Aurora, Illinois.

(Continued)

*Primary Examiner* — Thomas J Williams
*Assistant Examiner* — Mariano Sy
(74) *Attorney, Agent, or Firm* — The Webb Law Firm (57) ABSTRACT

A debris eradicating brake head for use in a side frame mounted braking system in a railway vehicle. The brake head being mounted on an end of a brake beam and including a brake shoe carrier associated with the brake head, a brake shoe secured to a face portion of the brake shoe carrier, and a brake head extension extending from a side portion of the brake shoe carrier for associating the brake head within a unit guide in a side frame of the railway vehicle. The brake head extension including at least one of a first and a second tapered surface configured for breaking up and pushing debris out of the unit guide in the side frame. Eradication of debris within the side frame increases the braking efficiency of the railway vehicle as it reduces the amount of force necessary for applying the brake shoes to the wheels.

20 Claims, 6 Drawing Sheets

(56) References Cited

U.S. PATENT DOCUMENTS

| | | | |
|---|---|---|---|
| 5,069,312 A * | 12/1991 | Kanjo | B61H 13/24 |
| | | | 188/33 |
| 5,361,876 A | 11/1994 | Haverick et al. | |
| 5,507,368 A * | 4/1996 | Barefoot | B61H 1/00 |
| | | | 188/153 R |
| 6,176,354 B1 | 1/2001 | Sauter et al. | |
| 6,234,283 B1 * | 5/2001 | Montes-Ramos | B60T 1/04 |
| | | | 188/219.1 |
| 6,397,979 B1 * | 6/2002 | Samulak | B61H 1/00 |
| | | | 188/228.6 |
| 6,551,003 B1 * | 4/2003 | De La Fuente-Farias | |
| | | | B60T 11/06 |
| | | | 188/219.1 |
| 7,430,794 B2 * | 10/2008 | Steffen | B61H 13/36 |
| | | | 188/219.1 |
| 7,802,662 B2 | 9/2010 | Sommerfeld et al. | |
| 7,931,130 B2 | 4/2011 | Ring | |
| 8,006,815 B2 | 8/2011 | Sommerfeld et al. | |
| 8,104,590 B2 * | 1/2012 | Fortuna | B61H 13/36 |
| | | | 188/236 |
| 8,230,985 B2 | 7/2012 | Sommerfeld et al. | |
| 8,556,044 B2 | 10/2013 | Marlow et al. | |
| 8,991,568 B2 | 3/2015 | Call et al. | |
| 9,540,020 B2 * | 1/2017 | Sunde | B61H 13/32 |
| 2004/0190978 A1 | 9/2004 | Fuente-Farias | |
| 2012/0037033 A1 | 2/2012 | Halford et al. | |

OTHER PUBLICATIONS

Unit Guide Bracket, EC-2055-Design Dimensions, AAR Manual of Standards and Recommended Practices: Truck Details and Casting Codes, Oct. 2010, p. 1.

* cited by examiner

DEBRIS ERADICATING BRAKE HEAD FOR A TRUCK MOUNTED BRAKE SYSTEM

BACKGROUND OF THE INVENTION

Field of the Invention

The present disclosure is directed to a brake head for beam securement of a railway braking system within a unit guide in a side frame, and more particularly, to a brake head having a brake head extension which is configured to eradicate debris which becomes trapped within the unit guide and reduces braking efficiency, and still more particularly, to a debris eradicating brake head for use with a truck mounted braking system which eliminates or reduces debris within the unit guide to yield more efficient braking.

Description of Related Art

Truck mounted braking systems are well-known in the railway industry and typically comprise a series of force transmitting members, levers and linkages which function to move a group of brake shoes against the wheels of a railway vehicle to effect stoppage of the railway vehicle. Examples of truck-mounted brake mechanisms include the TMX® or UBX® systems, owned by WABTEC Holding Corp., the assignee of the present invention. In these systems, two brake beams are provided per truck to provide the braking force to the two axles of the truck. The two brake beams are activated by at least one brake cylinder that is in fluid communication with a source of compressed air, such as an air reservoir mounted on the body of the railway vehicle.

In general, each brake beam includes a compression beam having its terminal ends coupled to the ends of a V-shaped tension beam. A brake head is provided at the opposing terminal ends of the compression beam and/or the V-shaped tension beam. Each brake head includes a brake shoe carrier adapted to receive a removable brake shoe. The brake mechanism is coupled to the truck of the railway vehicle at end portions of the brake heads. In operation, the brake beam having the compression beam and the V-shaped tension beam is suspended by brake head extension members which extend into and move within units guides located in the side frames of the railway truck bogie to allow movements of the braking system with the truck.

Any truck mounted brake system that uses unit guides for beam securement is susceptible to debris buildup such as snow, ice, ballast, etc. The unit guide is open so as to allow the brake beam to move back and forth freely. By design, there is nothing to stop the accumulation of debris in the unit guide. This accumulation of debris can be detrimental to braking efficiency. There is a need to design a brake head having an extension member which eliminates debris buildup and yields more efficient braking.

SUMMARY OF THE INVENTION

In accordance with an embodiment of the present disclosure, a debris eradicating brake head, mounted on an end of a brake beam, is provided for a railway vehicle. According to one embodiment, the debris eradicating brake head can be used with a truck mounted braking system for mounting the braking system in the side frame of the railway vehicle. The brake head includes a brake shoe carrier associated with the brake head, a brake shoe secured to a face portion of the brake shoe carrier, and a brake head extension extending from a side portion of the brake shoe carrier for associating the brake head with the railway vehicle. The brake head extension includes at least a first tapered surface configured to eradicate debris which may become trapped at the location where the brake head extension is associated with the railway vehicle, such as within a unit guide in the side frame of the railway vehicle.

The brake head extension can include a second tapered surface and the first and second tapered surfaces can be adjacently disposed with respect to each other. According to one embodiment, the first and second tapered surfaces are configured such that they cooperate together to form a concentrated point contact which applies a force to any debris located within a path of movement of the brake head extension. According to another embodiment, the first and second tapered surfaces cooperate together to form a line contact force configured to apply an amplified force to any debris located within a path of movement of the brake head extension and direct the debris away from the direction of motion of the brake head extension.

The first tapered surface can be tapered at an angle of approximately 30-80 degrees, approximately 60-80 degrees, or approximately 70 degrees with respect to a transverse plane extending through the brake head extension. The second tapered surface can be tapered at an angle of approximately 30-80 degrees, approximately 60-80 degrees, or approximately 70 degrees with respect to a transverse plane extending through the brake shoe carrier.

The brake head extension is configured to cooperate with a unit guide located within a side frame of the braking system for the railway vehicle for mounting the braking system within the railway vehicle and the tapered surface is configured for removing any debris which becomes trapped within the unit guide.

In accordance with another embodiment of the present disclosure, a debris eradicating brake head is provided for use with a railway braking system. The railway braking system includes a pair of brake beams mounted at each end of the brake system. Each of the brake beams have a brake head attached to each end thereof, each of the brake heads carry a brake shoe thereon, which are positioned for engagement with a respective railway vehicle during a brake application. Each of the brake heads comprise a brake head extension configured for cooperating with a respective unit guide in a side frame of the railway vehicle for movably mounting the brake beams in the braking system. The brake head extensions include at least a first taper configured to push out any accumulated debris trapped within the unit guide.

The brake heads include a brake shoe carrier for holding a brake shoe on a front face of the brake head. The brake head extension extends in an outward direction and which is generally perpendicular with respect to a side portion of the brake shoe carrier.

According to one embodiment, the brake head extension can include a second tapered surface. The first and second tapered surfaces can be adjacently disposed with respect to each other. The first and second tapered surfaces cooperate together to form a concentrated point contact configured to apply a force to any debris located within a path of movement of the brake head extension. The first and second tapered surfaces can also cooperate together to form a line contact force configured to apply an amplified force to any debris located within a path of movement of the brake head extension. These first and second tapered surfaces are configured to direct debris away from the direction of motion of the brake head extension.

According to one embodiment, the at least one of the first tapered surface and the second tapered surface can be tapered at an angle of approximately 30-80 degrees, approximately 60-80 degrees, or approximately 70 degrees with respect to a transverse plane extending through the brake head extension.

According to another embodiment of the present disclosure, a method of improving braking efficiency of a truck mounted braking system is provided. The railway braking system includes a pair of brake beams mounted at each end of the brake system. Each of the brake beams have a brake head attached to each end thereof, and each of the brake heads carry a brake shoe thereon. These brake shoes are positioned for engagement with a respective railway vehicle wheel during a brake application. Each of the brake heads comprise a brake head extension configured for cooperating with a respective unit guide in a side frame of the railway vehicle for movably mounting the brake beams in the braking system. The method comprises providing at least a first taper and a second taper on the brake head extensions. These first and second tapers are configured to break up and push out any accumulated debris trapped within the unit guide which improves the application of force applied by the brake shoes during braking of the railway vehicle.

The first and second tapers can be adjacently disposed with respect to each other to form a concentrated point contact for eradicating any accumulated debris trapped within the unit guide located within a path of movement of the brake head extension in the unit guide. At least one of the first and second tapered surfaces can be tapered at an angle of approximately 30-80 degrees, approximately 60-80 degrees, or 70 degrees with respect to a transverse plane extending through the brake head extension.

These and other features and characteristics of the device for eradicating debris from unit guides within truck side frames for increasing the braking efficiency of truck-mounted braking systems, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DESCRIPTION OF THE INVENTION

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to the drawings in which like reference characters refer to like parts throughout the several views thereof, the present disclosure is generally directed to a device for correcting uneven brake shoe wear on truck-mounted brakes of a railway vehicle.

Figure 1:
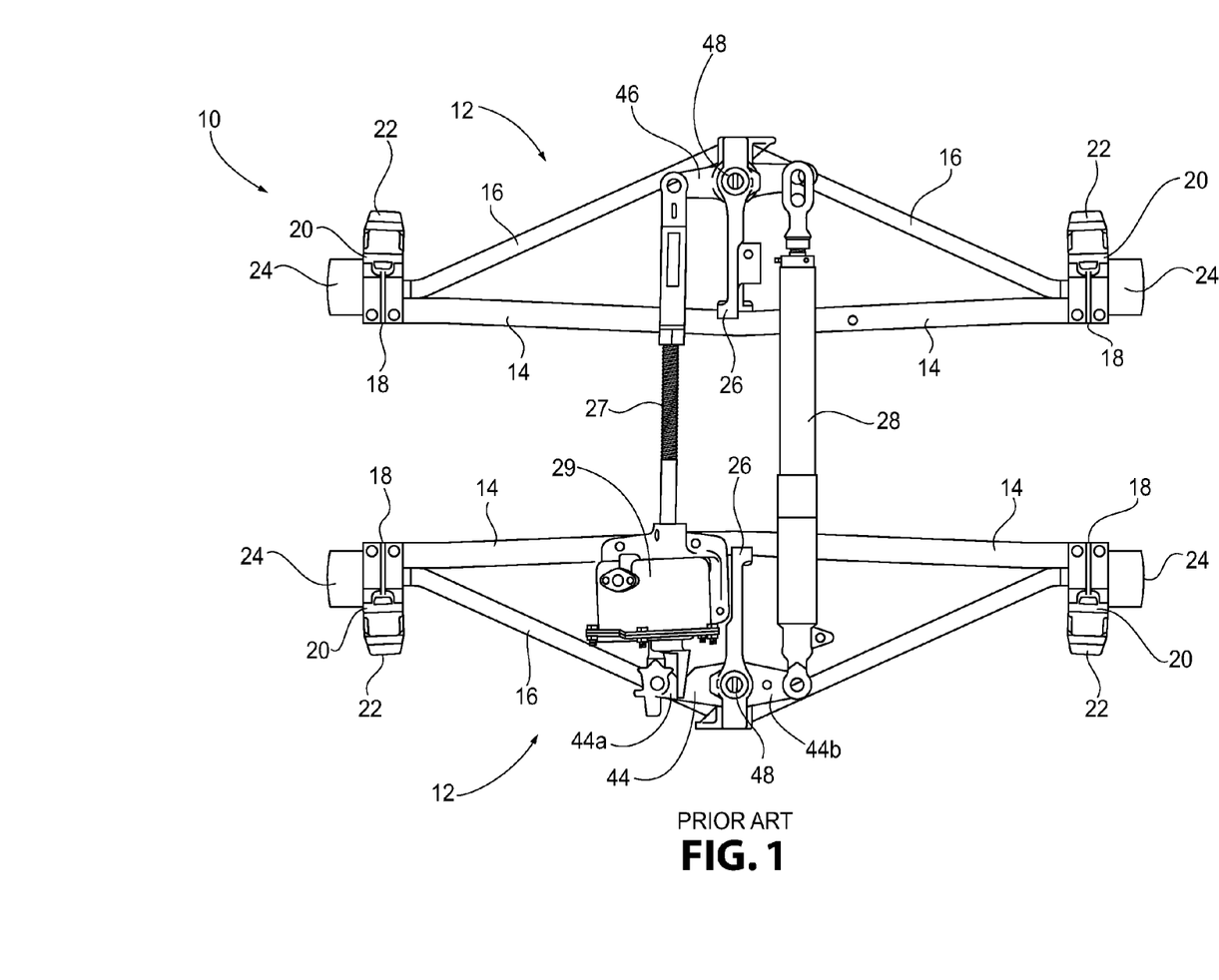
FIG. 1 is a top view of a truck mounted brake assembly in accordance with the prior art.

Reference is now made to FIG. 1, which shows a truck-mounted brake assembly, generally indicated as 10, which is commonly used in the art. The brake mechanism 10, as described herein, is intended for connection to a truck of a railway vehicle (not shown), as will be readily apparent to those skilled in the railway vehicle art. Examples of truck mounted braking systems include the TMX® or UBX® designs, owned by WABTEC Holding Corp., the assignee of the present invention. The brake mechanism 10 is adapted for use in railway vehicles adapted for passenger and/or cargo transit. However, this use is intended to be non-limiting and the brake mechanism 10 has applications in railway vehicles generally.

Figure 2:
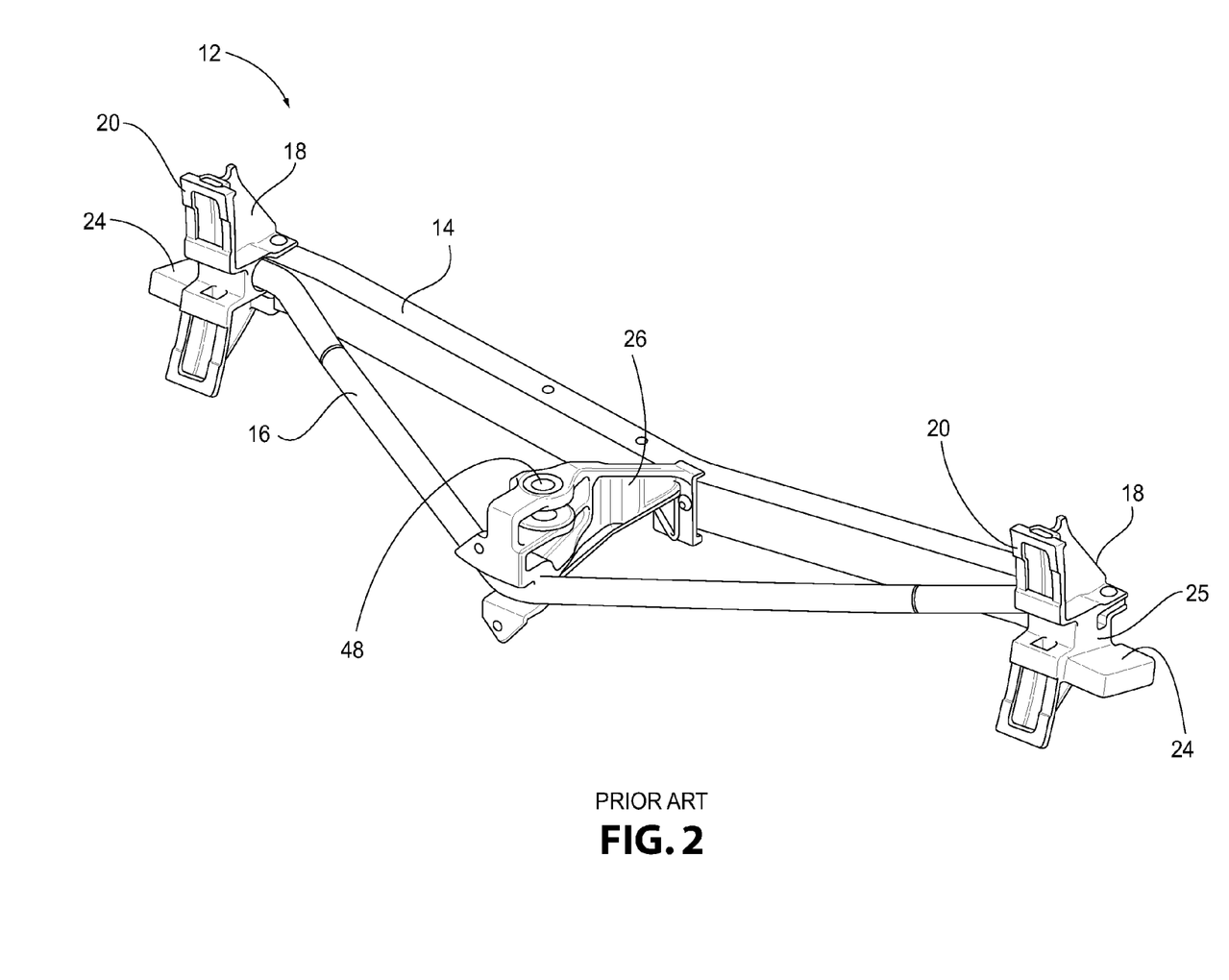
FIG. 2 is a perspective view of a brake beam of a truck mounted brake assembly of FIG. 1 showing a current brake head design in accordance with the prior art.

With continuing reference to FIGS. 1 and 2, the brake mechanism 10 includes a pair of brake beams, generally indicated as 12, which are substantially identical. Each of the brake beams 12 include a compression beam 14, a generally V-shaped tension beam 16 and a strut 26. The terminal ends of the compression beam 14 are coupled to the corresponding terminal ends of the tension beam 16. At a location substantially midway between their opposite ends, the compression beam 14 and the tension beam 16 of the respective brake beams 12 are spaced apart sufficiently to allow connection of the strut 26 therebetween.

A brake head 18 is provided at the opposing terminal ends of the compression beam 14 and/or the tension beam 16. Each brake head 18 includes a brake shoe carrier 20 adapted to receive a removable brake shoe 22. The brake mechanism 10 is coupled to the truck of the railway vehicle (not shown) at end portions or brake head extensions 24 extending from a side portion 25 (see FIG. 2) of the brake heads 18. The brake head extensions 24 cooperate with unit guides located within the truck side frames. In operation, the compression beam 14 and the tension beam 16 hang from the side frames of the truck.

With continuing reference to FIGS. 1 and 2, the brake mechanism 10 further includes a pair of force transmitting levers 44, 46 pivotally connected by pins 48 to the strut member 26 of the respective brake beam 12. The force transmitting members 44, 46 are interconnected by a rod 27 and a slack adjuster 28. As shown in FIG. 1, the rod 27 also connects a brake cylinder 29 to one end 44a of the force transmitting lever 44 for transferring the braking force exerted by the brake cylinder to the brake beam 12. The automatic slack adjuster 28 is attached to the opposing end 44b of the force transmitting lever 44 to automatically extend and move the brake heads 18 closer to the wheels of the railway vehicle in order to compensate for wear of the brake shoes 22.

Figure 3:
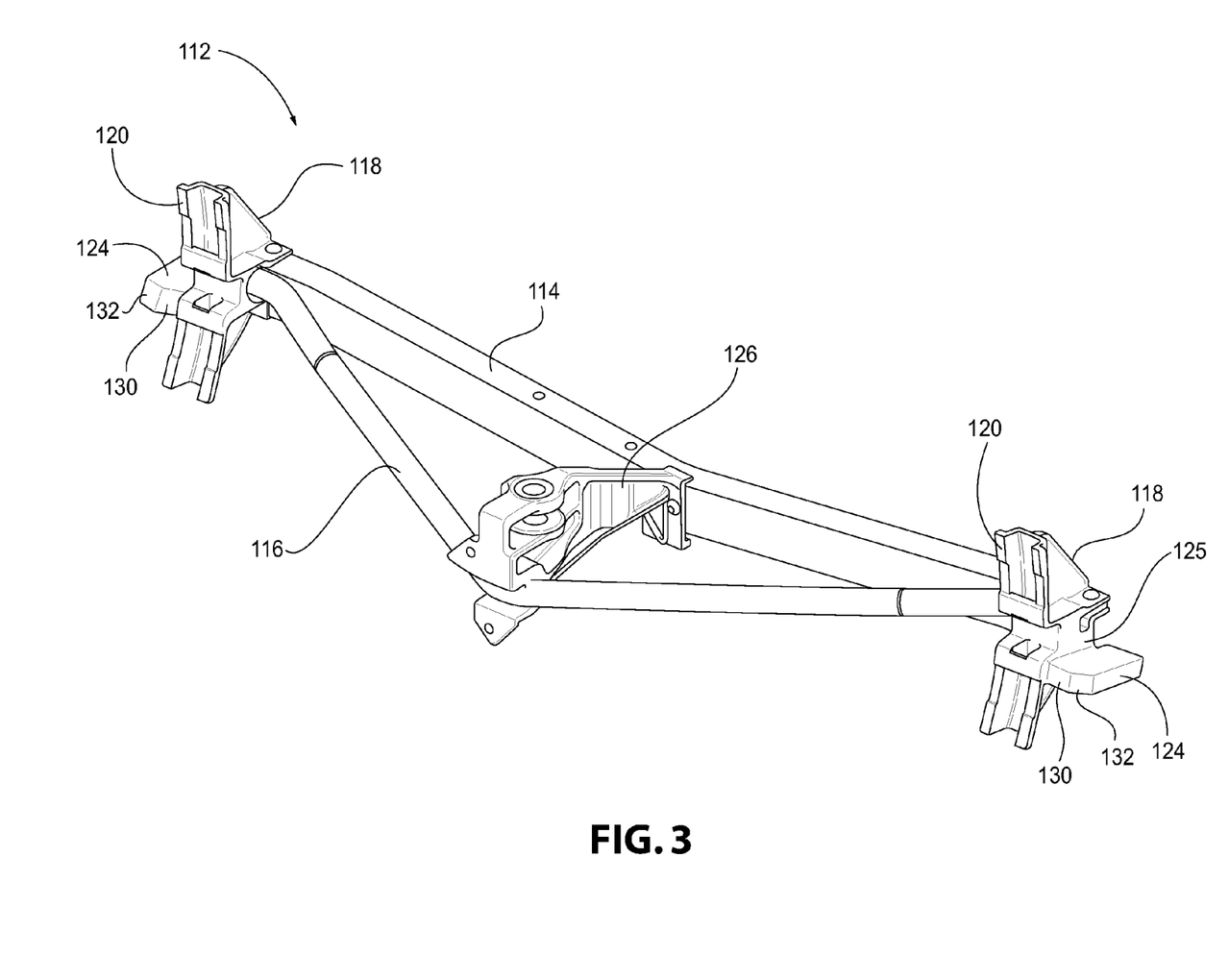
FIG. 3 is a perspective view of a brake beam of a truck mounted brake assembly showing the brake head in accordance with an embodiment of the present disclosure.
Figure 6:
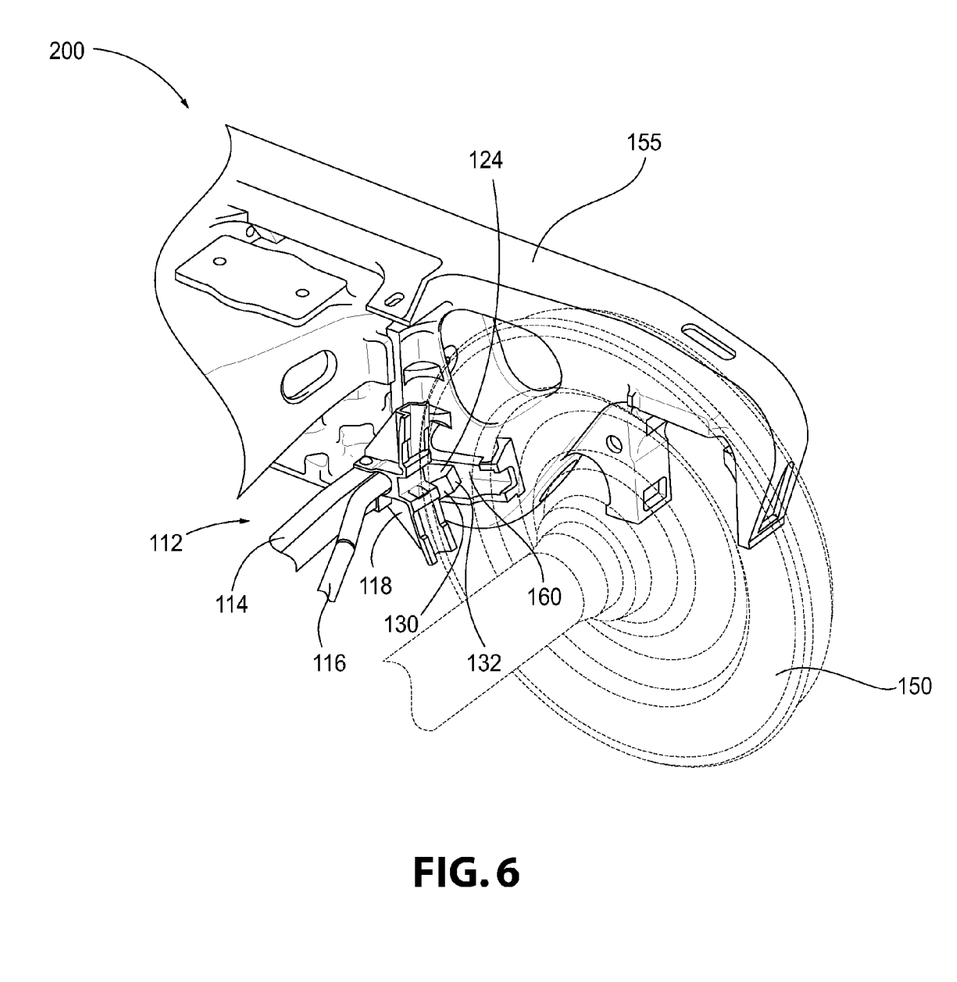
FIG. 6 shows a partial perspective view of the brake beam of FIGS. 5A and 5B cooperating with a unit guide in accordance with an embodiment of the present invention.

Reference is now made to FIGS. 3 and 6, which show a brake beam, generally indicated as 112, in accordance with the invention, for use within railway braking systems, such as a truck mounted braking system, including a brake head 118 in accordance with an embodiment of the present disclosure. The railway braking system includes a pair of brake beams 112, which are substantially identical, only one of which is shown in FIG. 3, mounted at each end of the braking system. Each of the brake beams 112 include a compression beam 114, a generally V-shaped tension beam 116 and a strut 126. The terminal ends of the compression beam 114 are coupled to the corresponding terminal ends of the tension beam 116. At a location substantially midway between their opposite ends, the compression beam 114 and the tension beam 116 of the respective brake beams 112 are spaced apart sufficiently to allow connection of the strut 126 therebetween. The brake head 118 is attached to each end of the brake beam 112. The brake head 118 includes a brake shoe carrier 120 configured to receive a removable brake shoe thereon (not shown), which can be changed as needed, when the brake shoe becomes worn.

As shown in FIG. 6, the brake head 118 is positioned for engagement with a respective railway vehicle wheel 150 during a brake application. The brake head 118 includes a brake head extension 124 extending from a side portion 125 of the brake shoe carrier 120 (see FIGS. 5A and 5B). The brake head extension 124 is configured for cooperating with a respective unit guide 160 in a side frame 155 of the railway vehicle for movably mounting the brake beam 112 in the braking system. Each braking system includes a pair of brake beams 112, each end of which includes brake heads 118 and brake head extension members 124 configured to cooperate with respective unit guides 160 in the side frames 155 for mounting the braking system in the truck, generally indicated as 200, of the railway vehicle. These unit guides 160 are susceptible to debris buildup such as snow, ice, ballast, etc. As shown in FIG. 6, the unit guide 160 is open so as to allow the brake head 118 to move back and forth freely. By design, there is nothing to stop the accumulation of debris in the unit guide 160. This accumulation of debris can be detrimental to braking efficiency.

Figure 4A:
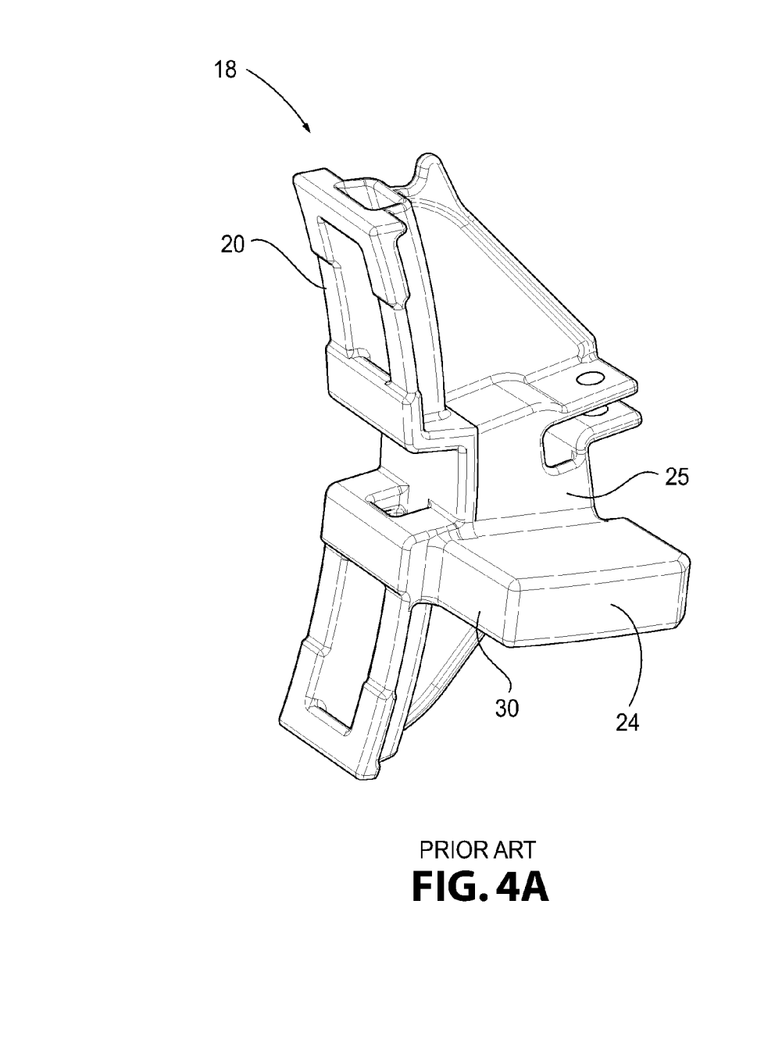
FIGS. 4A and 4B show front and side perspective views of the brake head of FIG. 3 in accordance with the prior art.
Figure 4B:
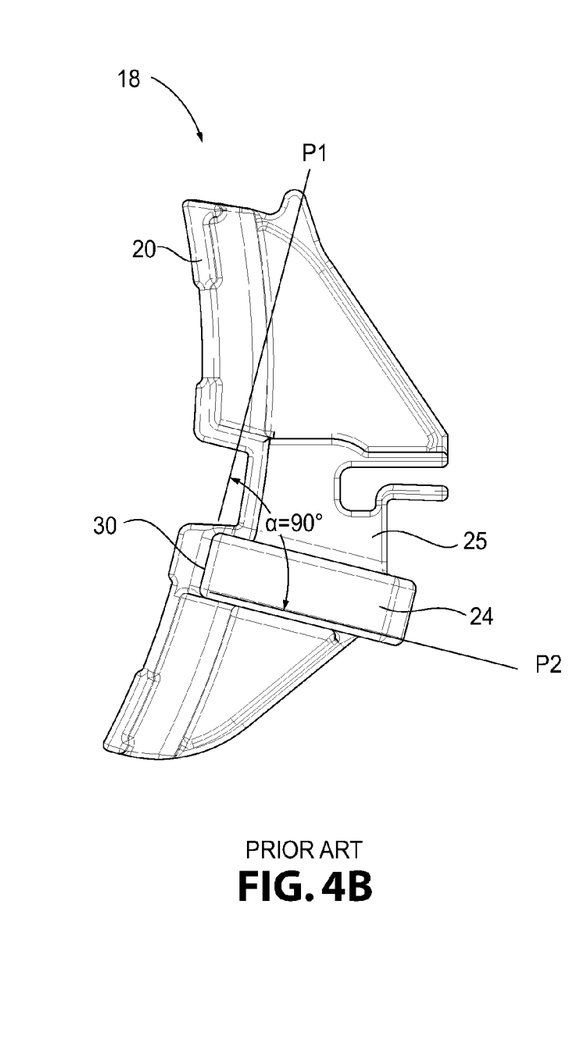
Figure 5A:
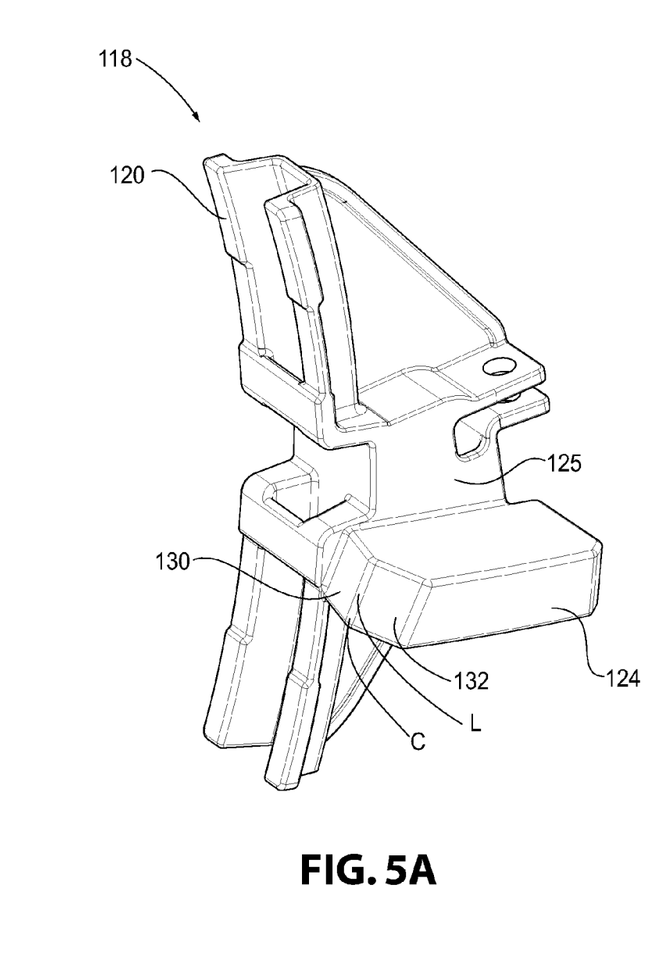
FIGS. 5A and 5B show front and side perspective views of the brake head of FIG. 3 in accordance with an embodiment of the present invention.
Figure 5B:
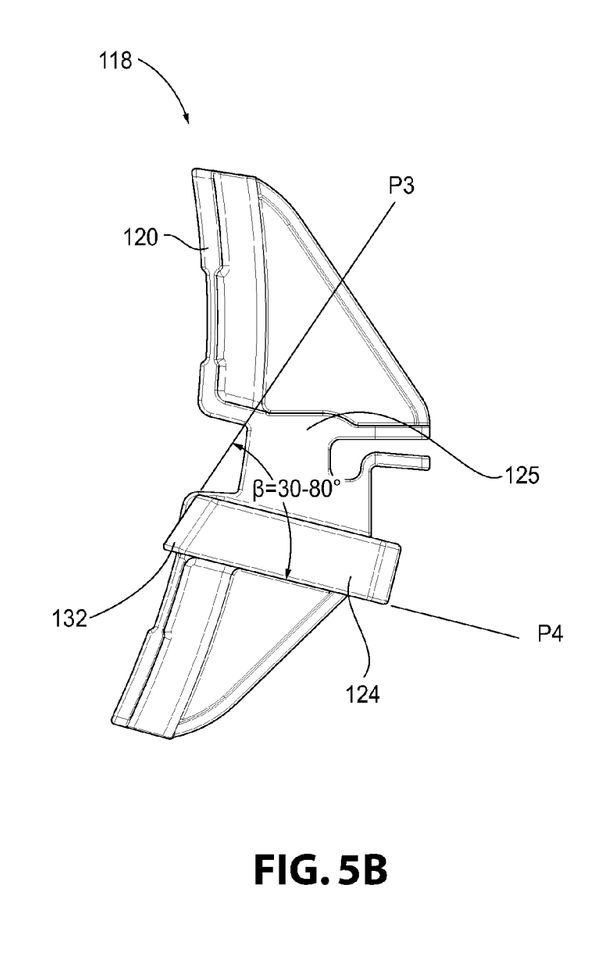

With continuing reference to FIGS. 3 and 6, and with further reference to FIGS. 5A and 5B, the brake head extension 124 includes at least a first tapered surface 130. A second tapered surface 132 can also be provided on the brake head extension 124. The first and second tapered surfaces 130 and 132 are adjacently disposed with respect to each other. As shown in FIGS. 4A and 4B, in the prior art designs, the brake head extension 24 extending from a side portion 25 of the brake shoe carrier 20, typically included a flat end guide 30 having a plane P1 which was perpendicular to the unit guide and formed an approximate angle α of approximately 90 degrees with respect to a transverse plane P2 extending through the brake head extension 18. This particular design resulted in a very distributed force contact being applied to any accumulated debris that became trapped in the unit guides.

Referring back to FIGS. 5A and 5B, the tapered surfaces 130, 132 change this normally distributed force into a concentrated point C or line contact force L. This concentrated point C or line contact L applied a concentrated or amplified force to any debris located within a path of movement of the brake head extension 124. The first tapered surface 130 acts to break up the debris and the second tapered surface 132 causes the debris to be directed outward away from the path of force application. According to one example, the series of tapers function like a snow plow moving through the unit guide 160 to direct debris away from the direction of motion of the brake head extension 124. The amplification of brake force coming from the brake head extension 124 results in more effective removal of debris, allowing less brake force being applied to the wheels to be lost.

According to one embodiment, at least the first tapered surface 130 can be tapered along a vertical plane P3 at an angle β of approximately 30-80 degrees with respect to a transverse plane P4 extending through the brake head extension 124. According to another embodiment, this angle β can be approximately 60-80 degrees or approximately 70 degrees. It can be appreciated that angle β can be varied in order to optimize the performance of the brake head extension 124 depending upon certain environmental conditions in order to effectively eradicate debris trapped within the unit guide 160. Second tapered surface 132 can also be tapered along a horizontal plane at an angle of approximately 30-80 degrees or approximately 70 degrees with respect to the transverse plane P4 extending through the brake head extension. As viewed in FIGS. 5A and 5B, this second tapered surface 132 would extend into the page. It can also be appreciated that tapered surfaces 130, 132 can be tapered at approximately the same angle with respect to each other or at different angles in order to optimize the performance of the brake head extension 124.

While various embodiments of the device for eradicating debris within unit guides of truck side frames for increasing braking efficiency of a railway vehicle were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A debris eradicating brake head for a railway vehicle, said brake head being mounted on an end of a brake beam and comprising a brake shoe carrier associated with the brake head, a brake shoe secured to a face portion of the brake shoe carrier, and a brake head extension extending from a side portion of the brake shoe carrier for associating the brake head with the railway vehicle, said brake head extension including at least a first tapered surface, the first tapered surface being tapered at an angle with respect to a transverse plane extending through the brake head extension.

2. The brake head of claim 1, wherein the brake head extension includes a second tapered surface.

3. The brake head of claim 2, wherein the first and second tapered surfaces are adjacently disposed with respect to each other.

4. The brake head of claim 3, wherein the first and second tapered surfaces cooperate together to form a concentrated point contact configured to apply a force to any debris located within a path of movement of the brake head extension.

5. The brake head of claim 3, wherein the first and second tapered surfaces cooperate together to form a line contact force configured to apply an amplified force to any debris located within a path of movement of the brake head extension.

6. The brake head of claim 3, wherein the first and second tapered surfaces are configured to direct debris away from the direction of motion of the brake head extension.

7. The brake head of claim 1, wherein the first tapered surface is tapered along a vertical plane at an angle of approximately 30-80 degrees with respect to the transverse plane extending through the brake head extension.

8. The brake head of claim 2, wherein the second tapered surface is tapered along a horizontal plane at an angle of approximately 30-80 degrees with respect to the transverse plane extending through the brake head extension.

9. The brake head of claim 1, wherein the brake head extension is configured to cooperate with a unit guide located within a side frame of the braking system for the railway vehicle and wherein the tapered surface is configured for removing any debris which becomes trapped within said unit guide.

10. A debris eradicating brake head for use with a railway braking system, said railway braking system including a pair of brake beams mounted at each end of the brake system, each of the brake beams having a brake head attached to each end thereof, each of the brake heads carrying a brake shoe thereon wherein each of the brake shoes are positioned for engagement with a respective railway vehicle during a brake application, each of said brake heads comprising a brake head extension configured for cooperating with a respective unit guide in a side frame of the railway vehicle for movably mounting the brake beams in the braking system, wherein said brake head extensions include at least a first tapered surface configured to push out any accumulated debris trapped within the unit guide, the first tapered surface being tapered at an angle with respect to a transverse plane extending through the brake head extension.

11. The brake head of claim 10, wherein the brake heads include a brake shoe carrier for holding a brake shoe on a front face of the brake head and wherein the brake head extension extends in an outward direction with respect to a side portion of the brake shoe carrier.

12. The brake head of claim 10, wherein the brake head extension includes a second tapered surface.

13. The brake head of claim 12, wherein the first and second tapered surfaces are adjacently disposed with respect to each other.

14. The brake head of claim 13, wherein the first and second tapered surfaces cooperate together to form a concentrated point contact configured to apply a force to any debris located within a path of movement of the brake head extension.

15. The brake head of claim 13, wherein the first and second tapered surfaces cooperate together to form a line contact force configured to apply an amplified force to any debris located within a path of movement of the brake head extension.

16. The brake head of claim 13, wherein the first and second tapered surfaces are configured to direct debris away from the direction of motion of the brake head extension.

17. The brake head of claim 10, wherein at least one of the first tapered surface and the second tapered surface is tapered at an angle of approximately 30-80 degrees with respect to the transverse plane extending through the brake head extension.

18. A method of improving braking efficiency of a truck mounted braking system, said truck mounted braking system including a pair of brake beams mounted at each end of the brake system, each of the brake beams having a brake head attached to each end thereof, each of the brake heads carrying a brake shoe thereon wherein each of the brake shoes are positioned for engagement with a respective railway vehicle wheel during a brake application, each of said brake heads comprising a brake head extension configured for cooperating with a respective unit guide in a side frame of the railway vehicle for movably mounting the brake beams in the braking system, said method comprising providing at least a first tapered surface and a second tapered surface on the brake head extensions, at least one of said first and second tapered surface being tapered at an angle with respect to a transverse plane extending through the brake head extension, said first and second tapered surfaces being configured to break up and push out any accumulated debris trapped within the unit guide and improve the application of force applied by the brake shoes during braking of the railway vehicle.

19. The method of claim 18, wherein the first and second tapered surfaces are adjacently disposed with respect to each other to form a concentrated point contact for eradicating any accumulated debris trapped within the unit guide located within a path of movement of the brake head extension in the unit guide.

20. The method of claim 18, wherein at least one of the first and second tapered surface is tapered at an angle of approximately 30-80 degrees with respect to the transverse plane extending through the brake head extension.

\* \* \* \* \*

UNITED STATES PATENT AND TRADEMARK OFFICE
CERTIFICATE OF CORRECTION

PATENT NO. : 9,856,933 B2  
APPLICATION NO. : 15/151724  
DATED : January 2, 2018  
INVENTOR(S) : Koziol et al.

Page 1 of 1

It is certified that error appears in the above-identified patent and that said Letters Patent is hereby corrected as shown below:

In the Claims

Column 8, Line 14, delete "claim 10," and insert -- claim 12, --

Signed and Sealed this
Fourteenth Day of May, 2019

Andrei Iancu
*Director of the United States Patent and Trademark Office*